United States Patent
Eckert

[19]

[11] Patent Number: 5,951,119
[45] Date of Patent: Sep. 14, 1999

[54] BRAKING SYSTEM FOR MOTOR VEHICLES

[75] Inventor: Alfred Eckert, Bodenheim, Germany

[73] Assignee: ITT Manufacturing Enterprises Inc., Wilmington, Del.

[21] Appl. No.: 08/973,091

[22] PCT Filed: Mar. 26, 1996

[86] PCT No.: PCT/EP96/01331

§ 371 Date: Feb. 12, 1998

§ 102(e) Date: Feb. 12, 1998

[87] PCT Pub. No.: WO96/33083

PCT Pub. Date: Oct. 24, 1996

[30] Foreign Application Priority Data

Apr. 19, 1995 [DE] Germany .............. 195 14 382

[51] Int. Cl.⁶ .............. B60T 8/44; B60T 8/48; B60T 13/72
[52] U.S. Cl. .............. 303/113.3; 188/356; 303/114.3; 303/119.2; 303/166; 303/DIG. 4; 303/113.4
[58] Field of Search .............. 303/113.4, 114.3, 303/155, 3, DIG. 3, DIG. 4, 113.3, 135, 125, 166, 119.2; 91/376 R, 369.1; 180/197; 188/356, 357; 60/545; 701/71, 91, 78, 70, 82, 83

[56] References Cited

U.S. PATENT DOCUMENTS

| | | | |
|---|---|---|---|
| 3,795,426 | 3/1974 | Sisson .............. | 180/197 |
| 3,856,105 | 12/1974 | Lewis et al. . | |
| 4,512,615 | 4/1985 | Kita et al. .............. | 303/114.3 |
| 4,659,153 | 4/1987 | Klech .............. | 303/114.3 |
| 5,044,700 | 9/1991 | Willmann .............. | 303/114.1 |
| 5,150,951 | 9/1992 | Leiber et al. .............. | 303/DIG. 4 |
| 5,178,441 | 1/1993 | Heibal et al. .............. | 303/114.3 |
| 5,201,573 | 4/1993 | Leiber et al. .............. | 303/113.4 |
| 5,248,189 | 9/1993 | Izumi et al. .............. | 303/113.3 |
| 5,261,730 | 11/1993 | Steiner et al. .............. | 303/113.4 |
| 5,342,120 | 8/1994 | Zimmer et al. .............. | 303/113.4 |

(List continued on next page.)

FOREIGN PATENT DOCUMENTS

| | | |
|---|---|---|
| 33 25 854 | 2/1984 | Germany . |
| 3511579 | 10/1986 | Germany . |
| 3545676 | 6/1987 | Germany . |
| 3844068 | 8/1990 | Germany . |
| 4102496 | 2/1992 | Germany . |
| 4329139 | 7/1994 | Germany . |
| 4324205 | 1/1995 | Germany . |
| 4410339 | 5/1995 | Germany . |
| 4443373 | 6/1995 | Germany . |
| 93/24353 | 12/1993 | WIPO . |
| 95/03196 | 2/1995 | WIPO . |

OTHER PUBLICATIONS

Search Report of the German Patent Office Relating to Parent German Patent Application No. 195 14 382.5.

*Primary Examiner*—Douglas C. Butler
*Attorney, Agent, or Firm*—Rader, Fishman & Grauer PLLC

[57] ABSTRACT

A brake system includes a controllable a pneumatic brake booster, whose control valve can be actuated independently of the driver's will by a solenoid. A control structure consisting of a brake pressure controller and a control valve positioning controller generate signals which represent the electrical current to be applied to the solenoid. To be able to use the brake system for the purpose of a control of a deceleration proportionally to the actuation force it is proposed, according to the invention, to use an installation for the generation of a signal, which represents an actuation force applied at the actuation pedal and which is applied, as input variable, to a prefilter, which contains a dynamic model of the actuation unit and whose output variable corresponds to the desired brake pressure and to use a pressure monitor which receives, as input variable, a signal representing the vehicle speed, which contains a dynamic model of the parts of the brake system connected to the actuation unit and of the vehicle behavior and whose output variable represents an estimated actual brake pressure value which is subtracted from the desired brake pressure for the formation of a control difference to be applied to the brake pressure controller.

16 Claims, 5 Drawing Sheets

U.S. PATENT DOCUMENTS

| | | | |
|---|---|---|---|
| 5,350,224 | 9/1994 | Nell et al. | 303/113.3 |
| 5,350,225 | 9/1994 | Steinere et al. | 303/113.4 |
| 5,367,942 | 11/1994 | Nell et al. | 303/113.4 |
| 5,427,442 | 6/1995 | Heibel | 303/114.3 |
| 5,454,279 | 10/1995 | Castel et al. | 303/113.4 |
| 5,460,074 | 10/1995 | Balz et al. | 303/114.3 |
| 5,605,088 | 2/1997 | Balz et al. | 91/369.1 |
| 5,788,337 | 8/1998 | Eckert | 303/DIG. 3 |
| 5,816,667 | 10/1998 | Jokic | 303/114.3 |

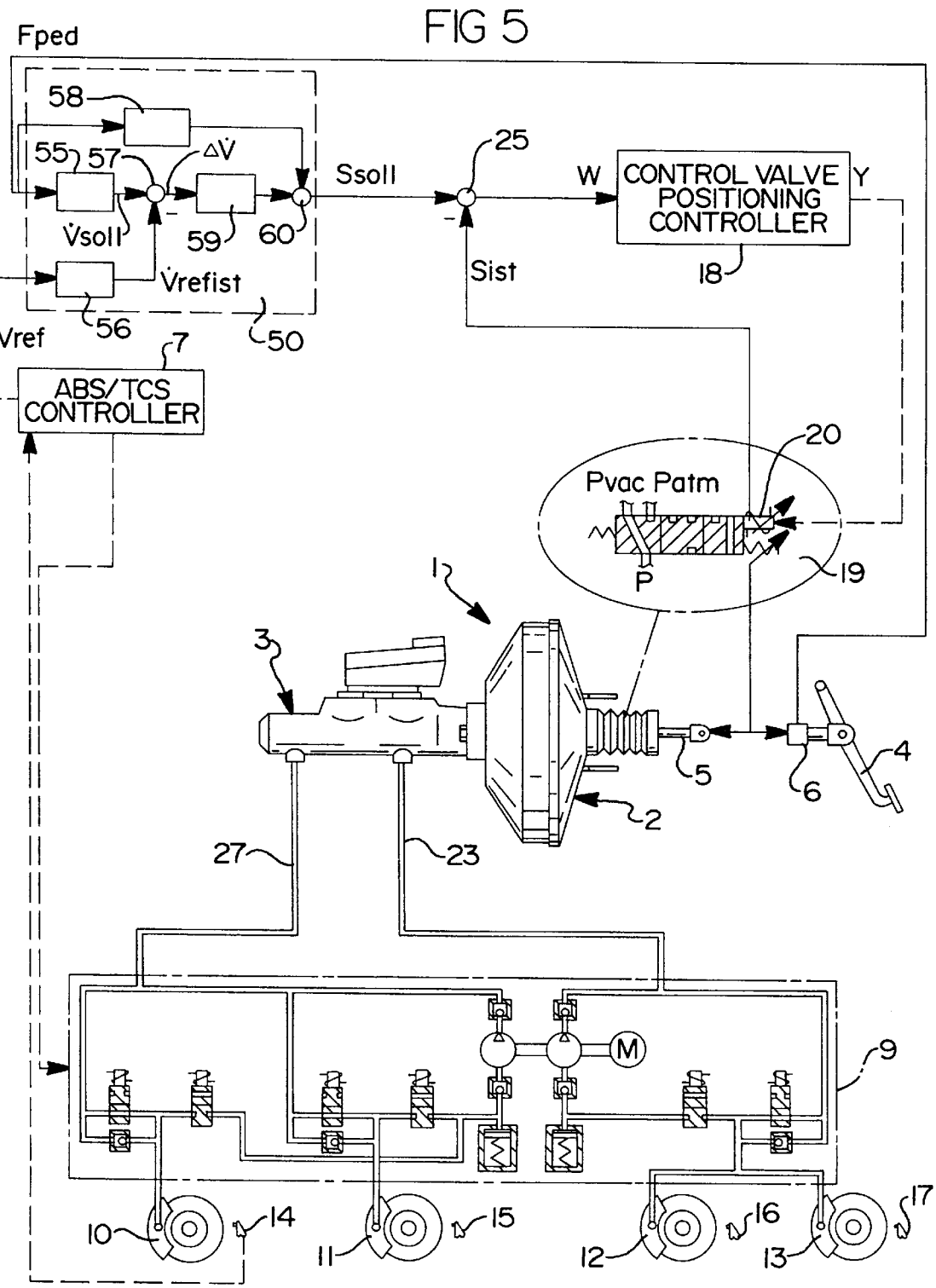

BRAKING SYSTEM FOR MOTOR VEHICLES

This application is a national stage filing under 35 U.S.C. 371 of international application no. PCT/EP96/01331 filed Mar. 26, 1996.

BACKGROUND OF THE INVENTION

The invention relates to a brake system for motor vehicles using an actuation unit which can be actuated by an actuation pedal, the actuation unit consisting of a pneumatic brake booster and a master brake cylinder, to which the wheel brakes are connected, where the control valve of the brake booster can be controlled independently of the driver's will by means of a solenoid, by means of whose armature one of the sealing seats of the control valve can be actuated, with a brake pressure controller, which is supplied with a control difference from a desired brake pressure and an actual brake pressure and from whose output variable, corresponding to a desired armature travel, a signal is subtracted, which corresponds to the actual armature travel, and where the second control difference thus generated is applied to a positioning controller which influences the position of the control valve, where the output variable of the positioning controller corresponds to the electrical current which is to be applied to the solenoid.

Such a brake system is known from International Patent Application WO 95/03196. The mentioned document contains, however, no concrete indications how the brake system described therein could be used for a deceleration control, proportional to the force of actuation.

In German Patent DE 33 25 854 C2 a brake controller for the control of a vehicle brake system has been disclosed, which works in cooperation with a brake booster which can be controlled independently of the driver's will, preferably electrically. The mentioned electrical control occurs by means of a control valve, located outside of the brake booster, which influences a pneumatic difference pressure which can be applied to the amplifier housing and which receives control signals of a data processing installation which processes, as input variables, signals of two sensor setups. The first sensor setup consists of a velocity sensor, whose signals are differentiated to determine vehicle decelerations. The second sensor setup consists of a force sensor, which is used for the determination of the actuation force applied at an actuation pedal. The second sensor setup can be replaced, as selected, by a third sensor setup, which determines the initial force of the brake booster, which is proportional to the hydraulic pressure or brake pressure which is generated in a master brake cylinder which is connected after the brake booster. The data processing installation contains statistical parameter lines, from which the desired values of the deceleration are determined.

In the already known controller, a drawback results from the errors in the control which occur during rapid operation by the driver, as a result of the use of the statistical characteristic lines, and which do not correspond to the natural desired behavior of the brakes.

Therefore, the problem of the present invention is to propose measures which make it possible, in the generic brake system, to obtain a problem-free post-control as well as a more slow, and a more rapid, actuation process. In addition, the desired vehicle deceleration should be reached rapidly, independently of influences which lead to a decrease in the deceleration, such as, for example, additional loading of the vehicle, trailer operation, fading/frictional losses or slope drag force in the case of downward trips.

SUMMARY OF THE INVENTION

A first solution of the problem on which the invention is based includes an installation for the generation of a signal, which represents an actuation force applied at the actuation pedal and which is applied as an input variable to a prefilter, which contains a dynamic model of the actuation unit and whose output variable corresponds to the desired brake pressure, and in providing a pressure monitor, to which a signal representing the vehicle speed is applied, as input variable, which monitor contains a dynamic model of the parts of the brake system attached to the actuation unit and of the vehicle behavior, and whose output variable represents an evaluated actual brake pressure value, which is subtracted from the desired brake pressure to form the control difference.

According to a second solution of the problem formulated above, an installation for the generation of a signal is provided, which signal represents an actuation force applied at the actuation pedal, and a force monitor, to which, as input variable, a signal representing the vehicle speed is applied, which monitor contains a dynamic model of the brake system, including the actuation unit, and of the vehicle behavior, and whose output variable is an evaluated actual actuation force, which is subtracted from the signal representing the actuation force for the formation of a control difference to be applied to the pressure controller which has been expanded with the dynamic model of the actuation unit.

A third solution of the problem on which the invention is based provides an installation for the generation of a signal which represents the actuation force acting at the actuation pedal and which is applied, as input variable, to a control structure which is connected before the brake pressure controller, whose second input variable consists of a signal representing the vehicle speed and whose output variable corresponds to the desired brake pressure.

Finally, a fourth solution of the problem provides an installation for the generation of a signal which represents an actuation force applied at the actuation pedal and which is applied, as input variable, to a control structure which is connected before the positioning controller, whose second input variable consists of a signal representing the vehicle speed and whose output signal corresponds to the desired armature travel.

Additional details, characteristics and advantages of the invention become apparent in the following description of four embodiment examples with reference to the enclosed drawings.

BRIEF DESCRIPTION OF THE DRAWINGS

In the drawings:

FIG. 5 represents a fourth embodiment of the brake system according to the invention in a schematic representation.

DETAILED DESCRIPTION OF THE DRAWINGS

Figure 1:
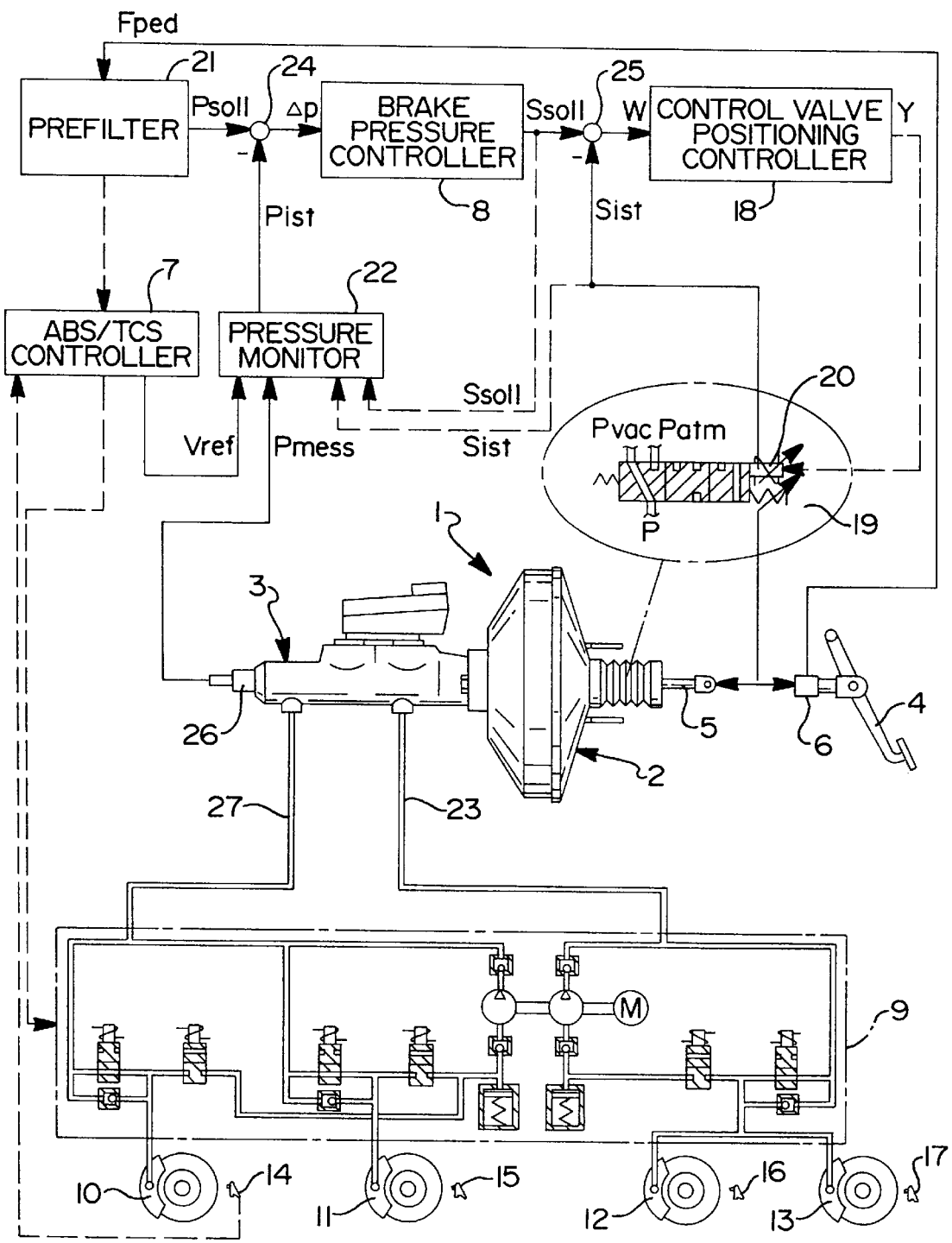
FIG. 1 represents a first embodiment of the brake system according to the invention in a schematic representation.

In the drawings, the same reference numerals are used for individual parts or function blocks which correspond to each other.

The brake system for automotive vehicles according to the invention shown in FIG. 1 consists essentially of an actuation unit 1, wheel brakes 10,11,12,13, a pressure modulator 9 arranged between the wheel brakes 10 to 13 and the actuation unit 1 as well as an ABS/TCS controller 7 which generates control signals for the pressure modulator. To each of the vehicle wheels, not shown, a wheel sensor 14,15,16, 17 is assigned, the control signal of which corresponds to the wheel speed and is delivered to he ABS/TCS controller 7 which generates a signal $v_{ref}$ representing the vehicle speed. The actuation unit 1 itself comprises a pneumatic brake booster 2, preferably a vacuum brake booster which is operable by means of a brake pedal and to the outlet side of which a master cylinder 3, preferably a tandem master cylinder, is connected, the non-shown pressure chambers of which are in connection with the pressure modulator via hydraulic conducts 23,27. To the actuation pedal 4 an actuation rod 5 is linked which makes possible an actuation of a control valve 19, shown only schematically, which controls the build-up of a pneumatic pressure difference in the housing of the vacuum brake booster 2.

Yet, a solenoid 20 makes possible a separate actuation of the control valve 19. An actuation force acting on the actuation pedal 4 is derived by means of a just schematically indicated force sensor 6. In order to carry out a deceleration control proportional to the actuation force ($F_{ped}$), an electronic controller or brake pressure controller 8 is provided, to which is delivered a control difference $\Delta p$ created in a first summer 24 between a nominal brake pressure signal $p_{soll}$ and an actual brake pressure signal $p_{ist}$.

The desired brake pressure signal $p_{soll}$ is generated by a prefilter 21, which receives, as input variable, the signal $F_{ped}$ representing the actuation force, and which contains a dynamic model of the actuation unit 1 or a generally nonlinear characteristic $p_{soll}$ as a function of $F_{ped}$. The actual brake pressure signal $p_{ist}$ is supplied by a pressure monitor 22, which receives, as input variable, the signal $v_{ref}$ representing the vehicle speed and which contains a dynamic model of all the parts of the brake system connection to the actuation unit 1 and of the vehicle behavior. The two characteristics are established during the construction design of the brake system, but they can also be added on-line with learning over time, for example, in situations, in which the control is not active. To increase the quality of the control process, it is advantageous to apply a signal $p_{mess}$ as a second input variable to the pressure monitor 22, which signal is supplied by a pressure sensor 26 which determines the hydraulic pressure in the master brake cylinder 3. Alternatively, the pressure monitor 22 can receive, as a second input variable, the output signal $S_{soll}$ of the brake pressure controller 8, which corresponds to the desired position of the armature, to be set, of the solenoid 20 which actuates the control valve 19. In a second summation device 25, a control valve position or current armature travel $S_{ist}$, which can be determined at the control valve 19, for example, by means of a travel sensor which is not shown, is subtracted from the desired armature travel $S_{soll}$, and the control difference W thus generated is supplied to a second, underlying, controller or control valve positioning controller 18, whose setting variable Y corresponds to the control of the solenoid 20. The signal $S_{ist}$, which corresponds to the actual armature travel, can be made available instead of the signal $S_{soll}$ as the second input variable to the pressure monitor 22.

Figure 2:
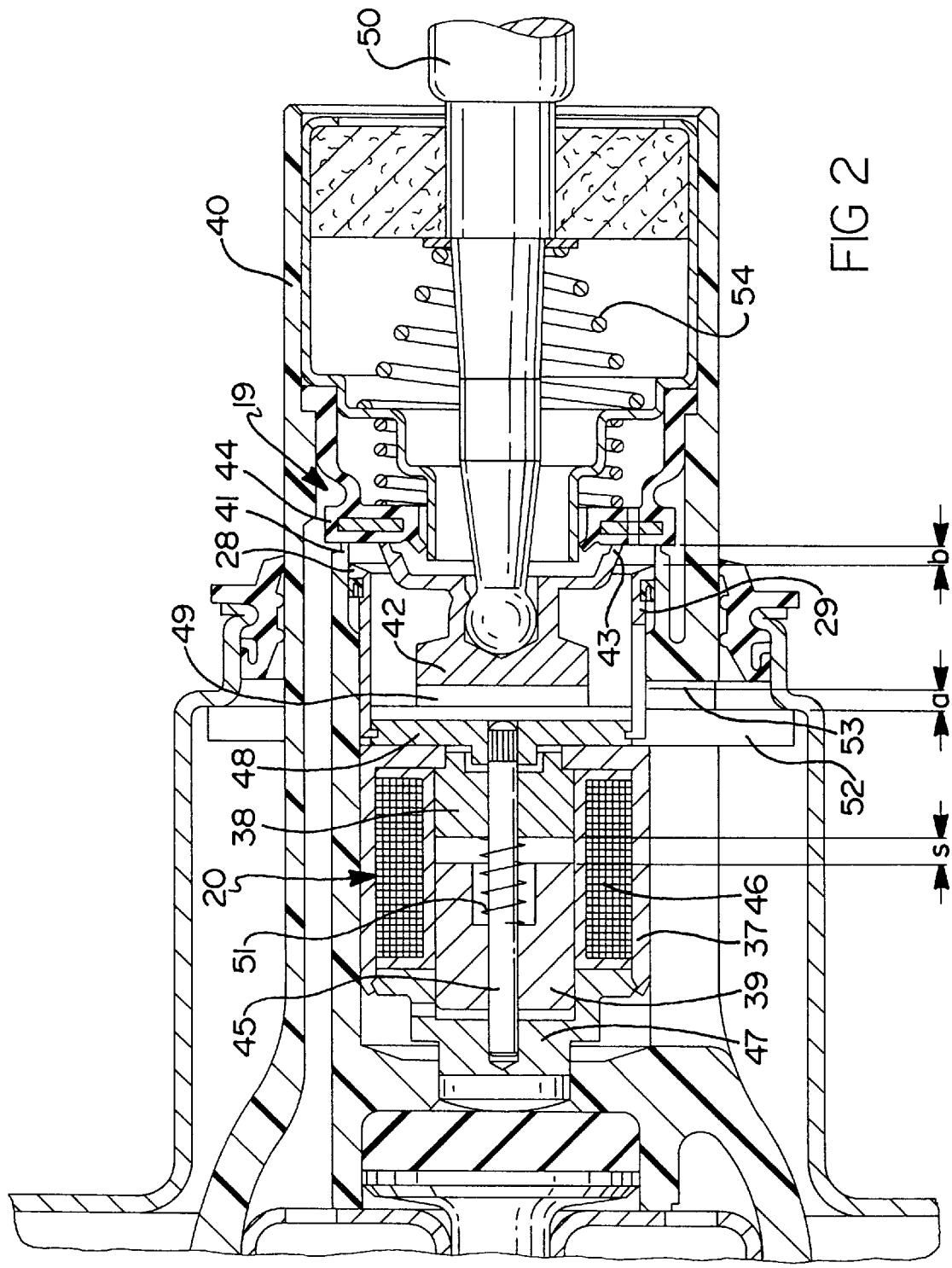
FIG. 2 represents the control group of the pneumatic brake booster according to FIG. 1 in an axial section, with partial detail.

As in particular shown in FIG. 2, the control valve 19 is accommodated in a control housing 40, guided in a sealed manner in the housing of the brake booster 2, and comprises a first sealing seat 41, formed on the control housing 40, a second sealing seat 43, formed on a valve piston 42 which is connected to the actuation rod 5, as well as a valve body 44 cooperating with both of the sealing seats.

In order to initiate a separate actuation of the brake booster 2 independent from the actuation rod 5, there is provided a third sealing seat between the first (41) and the second sealing seat 43, the third sealing seat being actuable by means of a solenoid 20 which preferably is located in a housing 37 formed by a pot-shaped elongation of the valve piston 42, and which therefore is slidable in the control housing 40 together with the valve piston 42.

The solenoid 20 comprises a coil 46, which is stuck on a guiding member 38 fixed inside the housing 37, as well as a cylindrical armature 39 which is arranged slidably therein and undetachably connected to a pin 45 which, on the one side, is guided in the guiding member 38 and, on the other side, in a closure member 47 closing the housing 37. A polar surface which is formed on the guiding member axially opposite of the armature 39 can preferably be designed as an outer cone so as to achieve a linearization of the force-travel characteristics of the solenoid 20. On its end facing the actuation rod 5, the pin 45 carries a force-transmitting plate 48 which preferably is designed as a rectangle and arranged in a radial groove 49 of the valve piston 42, and which makes possible a transfer of the separate actuation force applied by the solenoid 20 to the third sealing seat 28. For this purpose, the third sealing seat 28 is formed on a sleeve 29 which is guided in a sealed manner in the control housing and connected to the force-transmitting plate 48. Between the armature 39 partially projecting into the closing member 47 and the guiding member 38, a compression spring 51 is arranged which holds the armature 39 in its starting position in which the third sealing seat 28 is axially shifted (see distance b) relative to the second sealing seat 43 formed on the valve piston 42.

During separate braking initiated by means of energizing the coil 46, the armature 39 is shifted against the force of the compression spring 51 to the right in the drawing, whereby the third sealing seat 28 at first, after covering the distance "b", abuts on the sealing area of the valve body 44. By way of this abutment, the first sealing seat 41 which is formed on the control housing 40 is effectively bridged so that no connection exists any more between the non-shown pressure chambers of the brake booster. Subsequently, the third sealing seat 28 and the valve body move on together, whereby the second sealing seat 43 is opened and the ventilatable chamber of the brake booster 2 is ventilated. The movement of the third sealing seat 28 lasts until the armature 39 abuts on the guiding member 38 and the gap "s" between the two parts becomes zero. In case of a missing actuation force on the actuation rod 5, the control housing travels ahead relative to the valve piston by a certain distance which corresponds to a distance "a" between a transverse link 52, limiting the movement of the valve piston, and an abutment surface 53 formed on the control housing 40. The reason for this is a piston rod return spring moving the valve piston 42 to the right via the actuation rod 5 and trying to reclose the second valve seat 43. Since, however, the third sealing seat comoves synchronously due to the rigid connection of solenoid 20 and valve piston 42, the gap between valve body 44 and the second sealing seat 43 is kept open, that is by the dimension s-b. By this means, the ventilatable chamber of the brake booster 2 is connected to atmosphere, and a brake force is generated.

After a turn-off of the solenoid, the armature 39, together with the third sealing seat 28, moves to the left under the action of the spring 51, whereby the third sealing seat 28 is opened while the valve body 44 closes the second sealing seat 43. Since the first sealing seat 41—as mentioned above—remains open further on, the atmosphere is exhausted from the ventilatable chamber via the open connection between the pneumatic chambers, so that the pressure prevailing in the master cylinder 3 is discharged.

Via the first sealing seat 41, the ventilatable chamber is evacuated until the control assembly returns to its starting position and the transverse link 52 abuts on the housing of the brake booster 2. The control housing 40 can move until it abuts in the drawing on the left side of the transverse link 52 and the first sealing seat is closed. Then, the apparatus is in a release position.

A simplified representation of the control process is as follows:

The driver actuates the brake pedal 4 with a certain actuation force $F_{ped}$.

A certain brake pressure $p_{meas}$ and a certain vehicle deceleration $v_{ref}$ result from the actuation, without controller influence.

If, for example, because of decreasing friction of the brake coatings, the deceleration becomes smaller, the result is, in the case of a constant value of $p_{meas}$ and a slowed decrease of $v_{ref}$, a smaller value $p_{ist}$ evaluated by the pressure monitor 22 (due to a monitoring error).

As a result of an appropriate outside control of the brake booster 2, in the sense of a pressure increase, the control structure regulates a value $p_{ist}$, which is smaller than $p_{soll}$ until the vehicle deceleration corresponds with respect to the measured brake pressure to the model included in the pressure monitor 22.

The deceleration control thus works by exploiting the monitoring error. The observed brake pressure $p_{ist}$ and the measured brake pressure $p_{meas}$ are identically only as long as model and reality are in agreement. If the behavior of the brake system changes, then this change is reflected in a changed monitor signal (change of $p_{ist}$). Due to a change in the monitor feedback it is possible to influence the degree of correction and thus the type of the brake intervention. Disturbances of the measurement signals are weakened by the monitor characteristic.

One advantage of this embodiment is the simple and continuous generation of the models, defined by the construction design the vehicle, and the simple and robust controller setting (few parameters). Also, decelerations in the control travel are implicitly taken into account by the corresponding model formulation and regulated.

If the signal $S_{soll}$, which represents the desired armature travel, is used instead of the measurement variable $p_{meas}$, the resulting interpretation of the pressure monitor 22 as almost a Kalman filter due to the absence of the input data. The pressure monitor 22 also contains a model of the external actuation of the brake booster 2, particularly its control valve 20. This completion has an additional stabilizing effect on the overall control system, similar to a direct pressure measurement. The effect resembles that of a derivative component in the controller, but without difficult noise problems.

Figure 3:
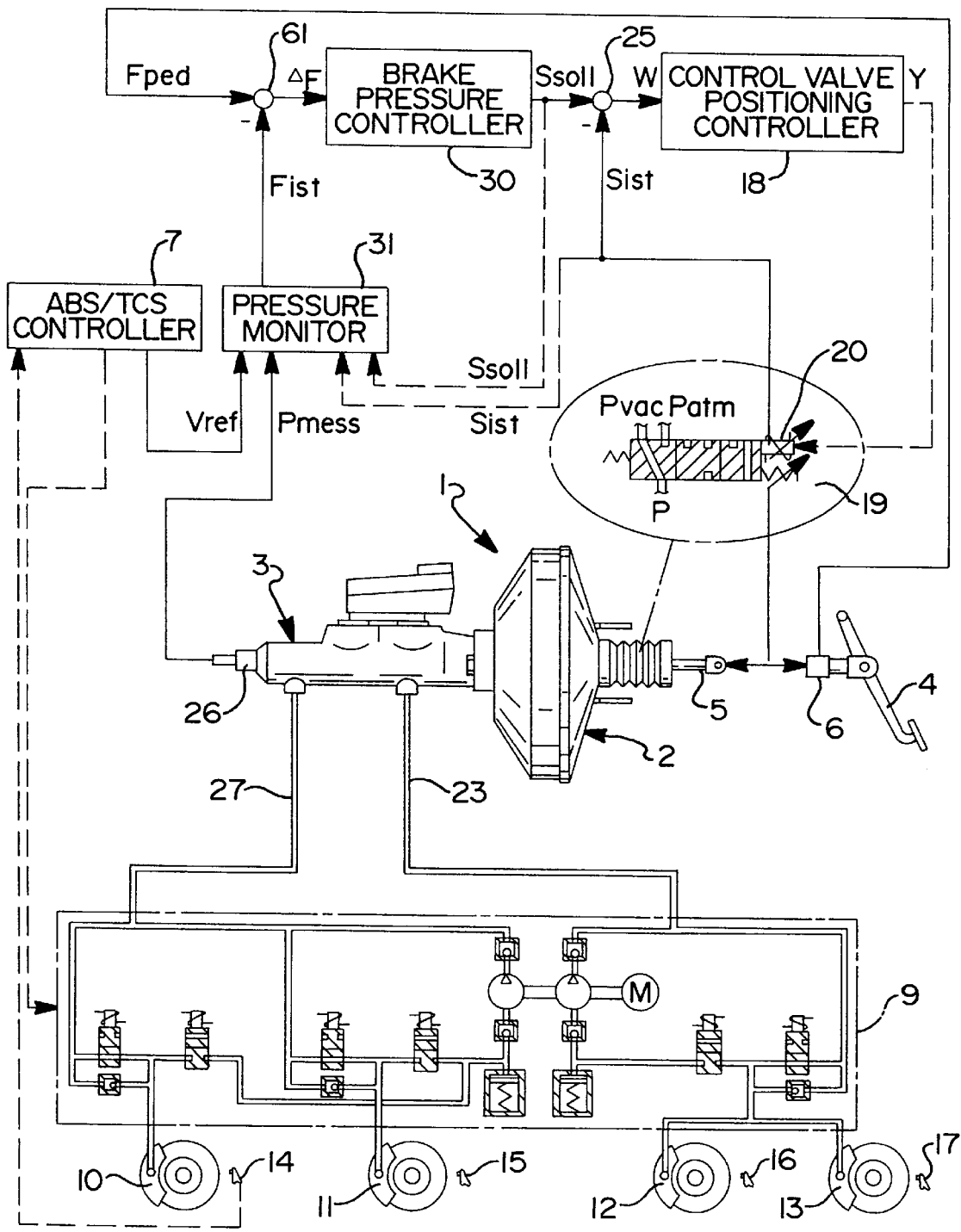
FIG. 3 represents a second embodiment of the brake system according to the invention in a schematic representation.

In the embodiment of the brake system according to the invention represented in FIG. 3, a brake pressure controller 30, which has been expanded compared to the brake pressure controller 8 represented in FIG. 1 by the dynamic model of the actuation unit 1, receives, as input variable, a control difference $\Delta F$ between the desired actuation force $F_{ped}$ determined by the force sensor 6 and an actual actuation force, formed in a summation device 61. The signal $F_{ist}$ which corresponds to the actual actuation force is supplied by a force monitor 31, which receives, as input variable, the above-mentioned speed velocity signal $v_{ref}$ and which contains a dynamic model of the entire brake system and the vehicle behavior. To increase the quality of the control process it is advantageous to apply, as a second input variable, the above-mentioned pressure measurement signal $p_{meas}$ to the force monitor 31. Alternately, the force monitor 31 can receive, as a second input variable, the output signal $S_{soll}$, of the expanded brake pressure controller 30, which can correspond to the desired position of the armature, to be set, of the solenoid 20 which actuates the control valve 19. Instead of the output signal $S_{soll}$ of the expanded brake pressure controller 30, it is also possible to make the signal $S_{ist}$ corresponding to the actual armature travel available to the force monitor 31, as its second input variable.

Figure 4:
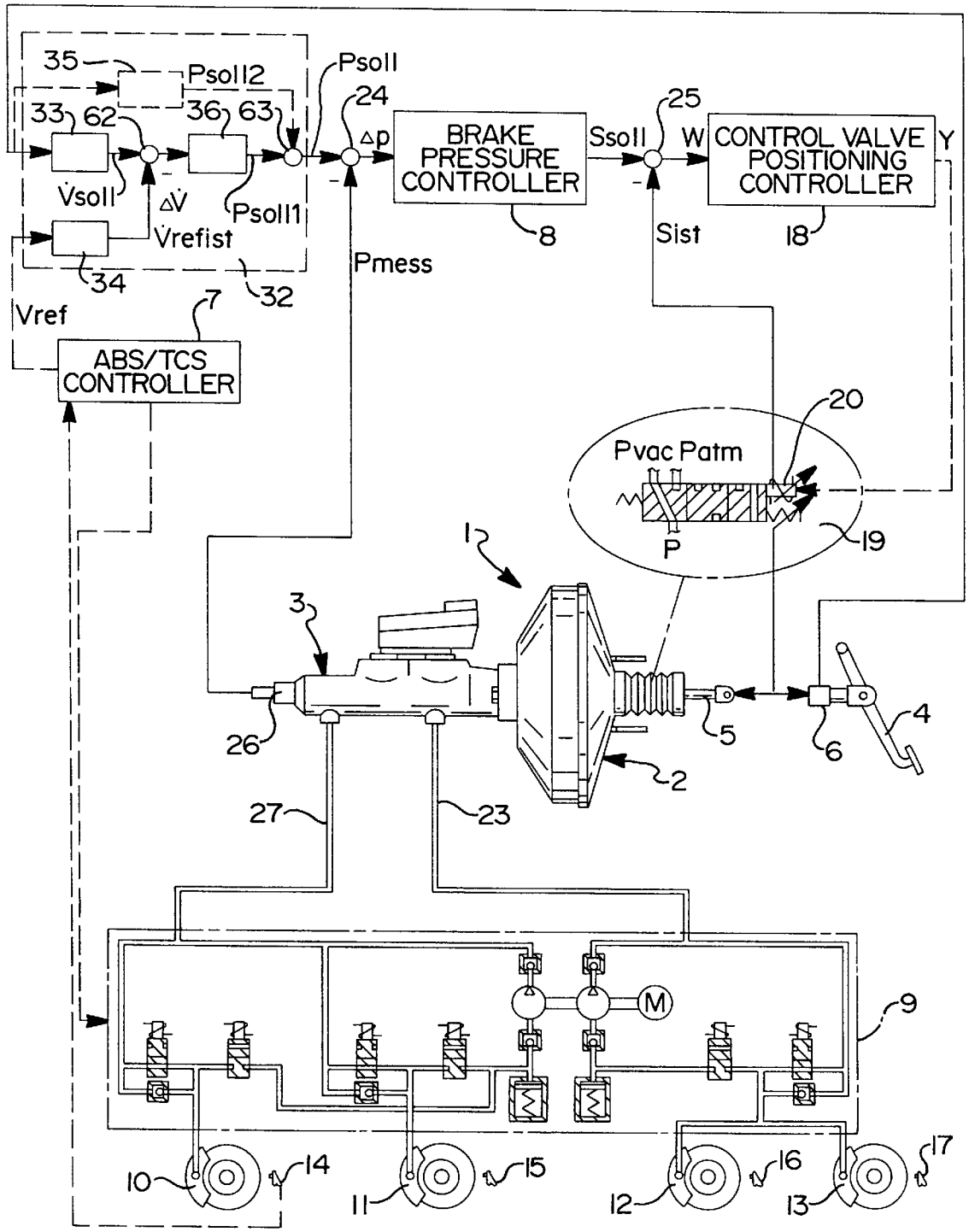
FIG. 4 represents a third embodiment of the brake system according to the invention in a schematic representation.

In the embodiment of the invention shown in FIG. 4, the above-mentioned desired brake pressure value $p_{soll}$ is formed in a control structure 32, which receives, as input variables, the output signal $F_{ped}$ of the force sensor 6 as well as the signal $v_{ref}$ of the ABS/TCS controller 7, which represents the vehicle speed. The control structure 32 here preferably comprises a prefilter 33, a differentiation device 34, a second prefilter 35 and an acceleration controller 36. The first prefilter or acceleration prefilter 33 assigns to the actuation force signal $F_{ped}$ which it receives a desired acceleration value $\dot{v}_{soll}$, from which the output signal $\dot{v}_{refist}$ of the differentiation device 34 is subtracted in a summation device 62, which output signal corresponds to the actual vehicle acceleration or vehicle deceleration $\dot{v}_{refist}$. The result of the mentioned subtraction $\Delta \dot{v}$ is applied, as input variable, to the acceleration controller 36, whose output variable $p_{soll}$ is added in a second summation device 63 to an input variable $p_{soll2}$ of the second or preliminary pressure filter 35, where the addition result represents the desired brake pressure value $p_{soll}$, mentioned in connection with FIG. 1. The construction of the preliminary pressure filter 35 is identical to the prefilter 21 mentioned in connection with FIG. 1.

A control process can be represented, in a simplified manner, as follows:

The driver actuates the brake pedal 4 with a certain actuation force $F_{ped}$.

A certain brake pressure and a certain vehicle deceleration result from the actuation, without controller influence.

The difference $\Delta \dot{v}$ between the output of the acceleration prefilter 33 and the actual deceleration $\dot{v}_{refist}$ is very small and it does not effect an output signal of the acceleration controller 36. Consequently, the second desired pressure value $p_{soll2}$ remains uninfluenced by the preliminary pressure filter 35. Since the behavior of the brake system has not changed, the desired and actual brake pressures are in agreement.

If, for example, because of decreasing friction effect of the brake coatings, the deceleration becomes smaller, the result is, with a constant value of $p_{meas}$ and a slowed decrease of $v_{ref}$, a positive output signal of the acceleration controller 36 and thus an increase of the desired brake pressure $p_{soll}$.

The control structure sets a value $p_{meas}$ which is smaller than $p_{soll}$, as a result of a corresponding external control of the brake booster 2, in the sense of a pressure increase, until the vehicle deceleration, with respect to the measured increased brake pressure, corresponds to the desired deceleration value $\dot{v}_{soll}$.

Finally, FIG. 5 shows a control structure 50, which is connected before the control valve positioning controller 18 mentioned in connection with FIG. 1, which receives, as input variables, the output signal $F_{ped}$ of the force sensor 6 and the signal $v_{ref}$ of the ABS/TCS controller 7, which represents the vehicle speed. The control structure 50 here preferably comprises a prefilter 55, a differentiation device 56, a preliminary control 58 and an acceleration controller 59. The prefilter or acceleration prefilter 55 assigns to the actuation force signal $F_{ped}$ assigned to it, a desired acceleration value $\dot{v}_{soll}$, from which the output signal $\dot{v}_{refist}$ of the differentiation device 56, which represents the actual vehicle acceleration or deceleration $\dot{v}_{refist}$, is subtracted in a summation device 57. The result of the mentioned subtraction $\Delta v$ is applied, as input variable, to the acceleration controller 59, whose output variable $p_{soll1}$ is added to the output variable $p_{soll2}$ of the preliminary control 58 in an additional summation device 60, where the result of the addition represents the desired armature travel $S_{soll}$ mentioned in connection with FIG. 1. In this embodiment, the preliminary control 58, which can be switched on or off as needed, represents a sequence function with changing actuation forces, that is a preliminary control of the control valve 19 of the brake booster 2, with respect to temporal changes in the actuation forces.

However, it is also conceivable to omit the preliminary control 58. In this case, the acceleration controller 59 must imitate the function of the preliminary control by means of appropriate desired positions.

I claim:

1. A brake system for motor vehicles using an actuation unit actuable by an actuation pedal and comprising a pneumatic brake booster and a master brake cylinder, to which wheel brakes are connected, where a control valve of the brake booster can be controlled independently of the actuation pedal by means a solenoid comprising an armature, by means of which a sealing seat of a control valve can be actuated, with a brake pressure controller, which is supplied with a first control difference from a desired brake pressure and an actual brake pressure and which provides an output variable from which, corresponding to a desired armature travel, a signal is subtracted, which corresponds to an actual travel of the armature, and where a second control difference thus generated is applied to a positioning controller which influences the position of the sealing seat, wherein by the positioning controller an output variable is provided which corresponds to an electrical current which is to be applied to the solenoid, wherein an installation for the generation of a signal is provided, which represents an actuation force exerted on the actuation pedal, and which is applied, as input variable, to a prefilter, which contains a dynamic model of the actuation unit and which provides an output variable corresponding to a desired brake pressure, and wherein a pressure monitor is provided, which receives, as input variable, a signal representing a vehicle speed, and which contains a dynamic model of the parts of the brake system connected to the actuation unit and of the vehicle behavior, and wherein the pressure monitor generates an output variable representing an estimated desired brake pressure value, which is subtracted from the desired brake pressure for the formation of the first control difference.

2. A brake system according to claim 1, wherein the pressure monitor receives, as a second input variable, a signal, which corresponds to a hydraulic pressure used to control the actuation unit.

3. The brake system according to claim 1, wherein the pressure monitor receives, as a second input variable, a signal representing a desired armature travel.

4. The brake system according to claim 1, wherein the pressure monitor receives, as a second input variable, a signal representing an actual armature travel.

5. The brake system according to claim 1, wherein the pressure monitor also contains a model of a pedal-independent actuation of the control valve.

6. A brake system for motor vehicles using an actuation unit actuable by an actuation pedal and comprising a pneumatic brake booster and a master brake cylinder, to which wheel brakes are connected, where a control valve of the brake booster can be controlled independently of the actuation pedal by means a solenoid comprising an armature, by means of which a sealing seat of a control valve can be actuated, with a brake pressure controller, which is supplied with a first control difference from a desired brake pressure and an actual brake pressure and which provides an output variable from which, corresponding to a desired armature travel, a signal is subtracted, which corresponds to an actual travel of the armature, and where a second control difference thus generated is applied to a positioning controller which influences the position of the sealing seat, wherein by the positioning controller an output variable is provided which corresponds to an electrical current which is to be applied to the solenoid, wherein an installation for the generation of a signal is provided, which represents an actuation force acting at the actuation pedal and wherein a force monitor is provided, which receives, as input variable, a signal representing a vehicle speed, and which contains a dynamic model of the brake system including the actuation unit and of the vehicle behavior, and which generates an output variable representing an estimated actual actuation force which is subtracted from a signal representing a pedal actuation force for the generation of a control difference which is delivered to a pressure controller extended by the addition of the dynamic model of the actuation unit.

7. The brake system according to claim 6, wherein the force monitor receives, as a second input variable, a signal corresponding to a hydraulic pressure used for the control of the actuation unit.

8. The brake system according to claim 6, wherein the force monitor receives, as a second input variable, a signal representing a desired armature travel.

9. The brake system according to claim 6, wherein the pressure monitor receives, as a second input variable, a signal representing an actual armature travel.

10. A brake system for motor vehicles using an actuation unit actuable by an actuation pedal and comprising a pneumatic brake booster and a master brake cylinder, to which wheel brakes are connected, where a control valve of the brake booster can be controlled independently of the actuation pedal by means a solenoid comprising an armature, by means of which a sealing seat of a control valve can be actuated, with a brake pressure controller, which is supplied with a first control difference from a desired brake pressure and an actual brake pressure and which provides an output variable from which, corresponding to a desired armature travel, a signal is subtracted, which corresponds to an actual travel of the armature, and where a second control difference thus generated is applied to a positioning controller which influences the position of the sealing seat, wherein by the positioning controller an output variable is provided which corresponds to an electrical current which is to be applied to the solenoid, wherein an installation is provided for the generation of a signal, which represents an actuation force applied at the actuation pedal and which is applied, as a first input variable, to a control structure which is connected before the brake pressure controller, and which receives a second input variable formed by a signal representing a vehicle speed and which provides an output variable corresponding to the desired brake pressure.

11. The brake system according to claim 10, wherein the control structure is delivered, from a prefilter which assigns a desired acceleration value to the signal, to a differentiation device for differentiating with respect to time a signal representing a vehicle speed, which provides an output variable which is subtracted from the output variable of the prefilter for the formation of a control difference, which is applied to an acceleration controller which is connected before the brake pressure controller, and whose output variable corresponds to the desired brake pressure which is to be applied to the brake pressure controller.

12. The brake system according to claim 11, wherein the output variable of the acceleration controller is added to the output variable of a second prefilter, which contains a dynamic model of the actuation unit and which receives, as input variable, a signal representing an actuation force, where the addition result corresponds to the desired brake pressure which is to be applied to the brake pressure controller.

13. A brake system for motor vehicles using an actuation unit actuable by an actuation pedal and comprising a pneumatic brake booster and a master brake cylinder, to which wheel brakes are connected, where a control valve of the brake booster can be controlled independently of the actuation pedal by means a solenoid comprising an armature, by means of which a sealing seat of a control valve can be actuated, with a positioning controller, which is supplied with a control difference from a desired brake pressure and an actual brake pressure, and which provides an output variable corresponding to an electrical current which is to be applied to the solenoid, wherein an installation for the generation of a signal is provided, which signal represents an actuation force exerted on the actuation pedal and which is delivered, as input variable to a control structure which is connected before the positioning controller, where a second input variable of the control structure is formed by a signal representing a vehicle speed, the control structure generating an output variable corresponding to a desired armature travel.

14. The brake system according to claim 13, wherein the control structure comprises a prefilter, which assigns a desired acceleration value to the signal, and a differentiation device for differentiating with respect to time a signal representing a vehicle speed, which provides an output variable which is subtracted from the output variable of the prefilter for the formation of a control difference, which is applied to an acceleration controller which is connected before the positioning controller, and whose variable corresponds to the desired armature travel.

15. The brake system according to claim 14, wherein the output variable of the acceleration controller is added to the output variable of a preliminary control for the formation of a signal corresponding to the desired armature travel, which preliminary control contains a sequence function for actuation forces which change over time, and which receives, as input variable, the signal representing the actuation force.

16. The brake system according to claim 15, wherein the preliminary control can be switched off.

\* \* \* \* \*